(12) United States Patent
Koga et al.

(10) Patent No.: US 7,570,447 B2
(45) Date of Patent: Aug. 4, 2009

(54) STORAGE CONTROL DEVICE AND METHOD FOR DETECTING WRITE ERRORS TO STORAGE MEDIA

(75) Inventors: Tsutomu Koga, Matsuda (JP); Mitsuru Inoue, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 1129 days.

(21) Appl. No.: 11/022,781

(22) Filed: Dec. 28, 2004

(65) Prior Publication Data

US 2006/0098320 A1 May 11, 2006

(30) Foreign Application Priority Data

Nov. 5, 2004 (JP) .............................. 2004-322307

(51) Int. Cl.
*H03M 13/00* (2006.01)
(52) U.S. Cl. .................... 360/53; 714/758; 714/763; 714/776; 714/807
(58) Field of Classification Search .................. None
See application file for complete search history.

(56) References Cited

U.S. PATENT DOCUMENTS 6,681,364 B1 * 1/2004 Calvignac et al. ........... 714/776
7,065,702 B2 * 6/2006 Oren ........................... 714/807
7,131,050 B2 * 10/2006 Holt ............................ 714/763
7,372,651 B2 * 5/2008 Gunderson et al. ........... 360/53

FOREIGN PATENT DOCUMENTS

JP 2000-347815 12/2000

* cited by examiner

*Primary Examiner*—Joseph H Feild
*Assistant Examiner*—Tawfik Goma
(74) *Attorney, Agent, or Firm*—Antonelli, Terry, Stout & Kraus, LLP.

(57) ABSTRACT

There are provided a cache region that stores write data from a host device, storage media, a data storage region for the storage media, and a comparison unit. A first comparison object is generated for N items of write data on the cache region and the N items of write data are transferred to the data storage region. Write data is read from a designated address of the data storage region and this write data is written to the storage media. When N items of write data have been read, a second comparison object is generated in respect of the write data. The comparison unit compares the first comparison object and the second comparison object, and if the result of the comparison is a mismatch, the N items of write data on the cache region are again transferred to the data storage region.

16 Claims, 13 Drawing Sheets

FIG. 5
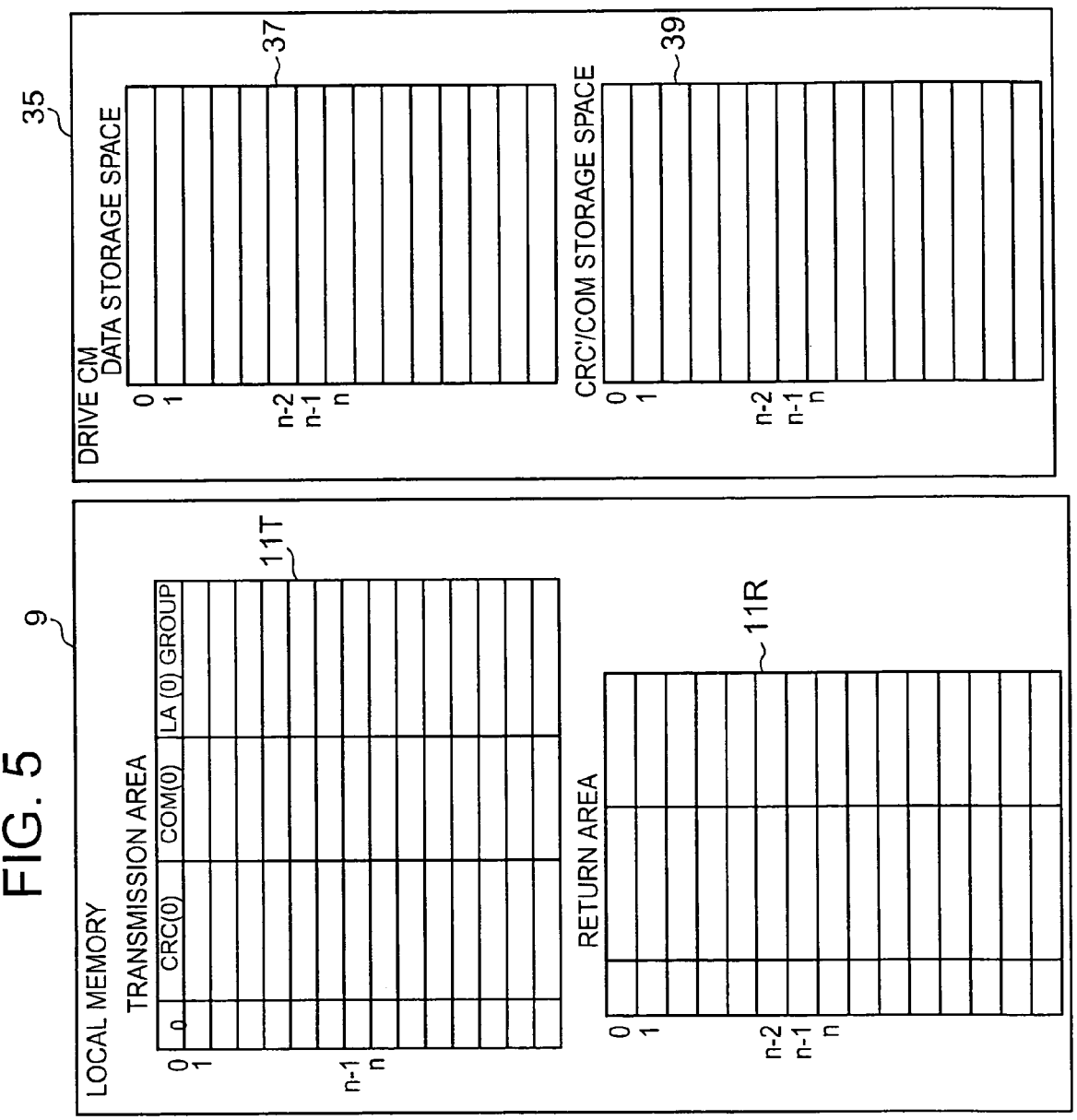
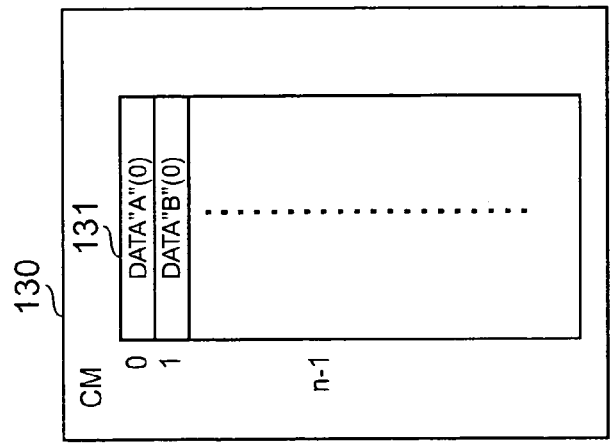

FIG. 8

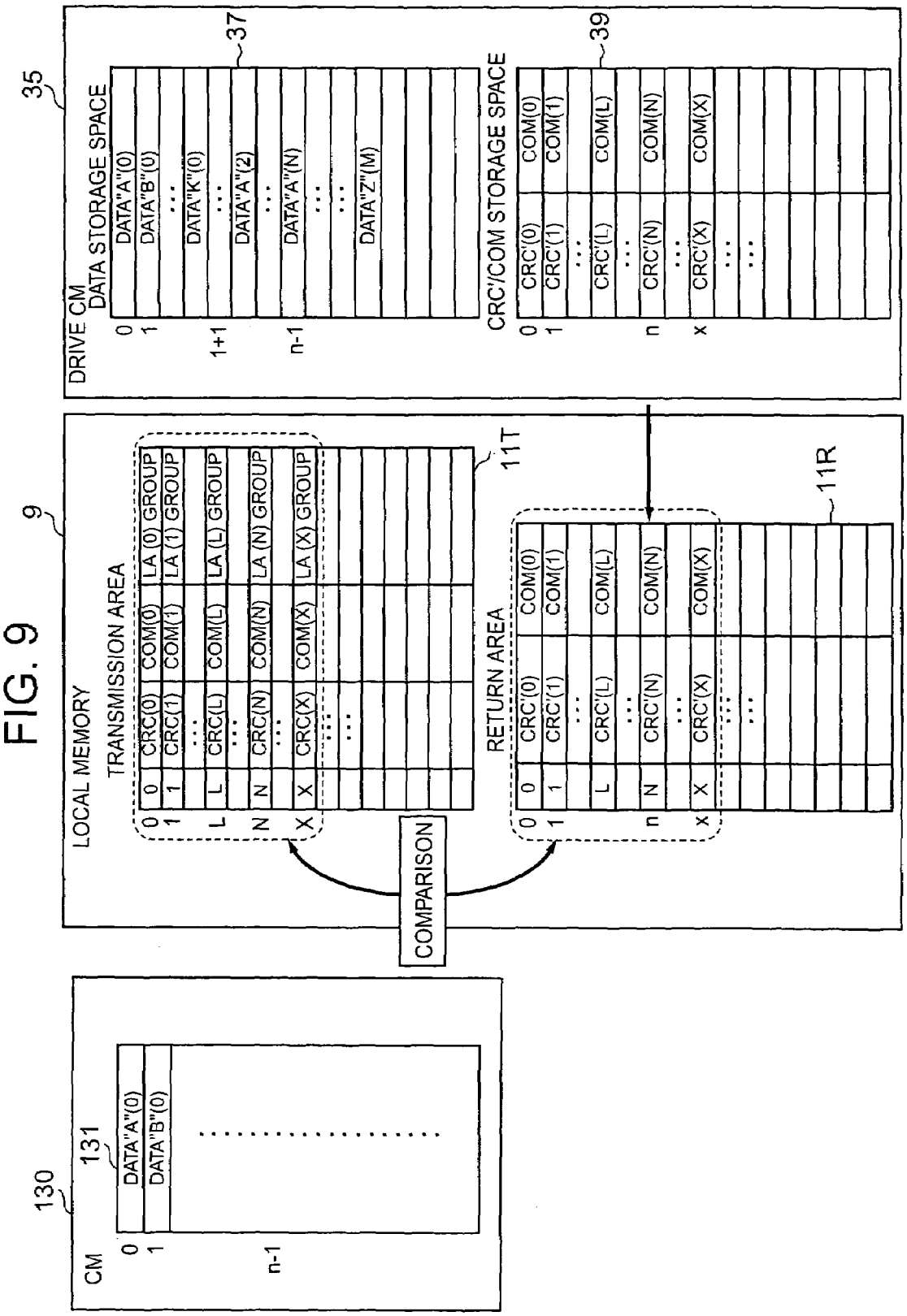

FIG. 10

LOCAL MEMORY

TRANSMISSION AREA (11T)

| | | | | |
|---|---|---|---|---|
| 0 | CRC(0) | COM(0) | LA(0) GROUP | |
| 1 | CRC(1) | COM(1) | LA(1) GROUP | |
| ... | ... | ... | ... | |
| L | CRC(L) | COM(L) | LA(L) GROUP | |
| L+1 | CRC(L+1) | COM(L+1) | LA(L+1) GROUP | |
| ... | ... | ... | ... | |
| N-1 | CRC(N-1) | COM(N-1) | LA(N-1) GROUP | |
| N | CRC(N) | COM(N) | LA(N) GROUP | |

RETURN AREA (11R)

| | | |
|---|---|---|
| 0 | CRC'(0) | COM(0) |
| 1 | CRC'(1) | COM(1) |
| ... | ... | ... |
| L | CRC'(L) | COM(L) |
| L+1 | CRC'(L+1) | COM(L+1) |
| ... | ... | ... |
| n-1 | CRC'(N-1) | COM(N-1) |
| | CRC'(N) | COM(N) |

DRIVE CM (35)

DATA STORAGE SPACE (37)

| | |
|---|---|
| 0 | DATA"A"(0) |
| 1 | DATA"A"(1) |
| ... | ... |
| l+1 | DATA"A"(L) |
| | DATA"A"(2) |
| n-1 | DATA"A"(N) |
| | ... |
| | DATA"Z"(M) |

CRC'/COM STORAGE SPACE (39)

| | | |
|---|---|---|
| 0 | CRC'(0) | COM(0) |
| 1 | CRC'(1) | COM(1) |
| ... | ... | ... |
| l-1 | CRC'(L) | COM(L) |
| | CRC'(L+1) | COM(L+1) |
| n-1 | CRC'(N-1) | COM(N-1) |
| n | CRC'(N) | COM(N) |

CM (130)

| | |
|---|---|
| 0 | (131) |
| 1 | |
| ... | |
| n-1 | DATA"A"(X+1) ...... |

FIG. 11

LOCAL MEMORY 9

TRANSMISSION AREA 11T

| | | | | |
|---|---|---|---|---|
| 0 | CRM(X) | COM(X) | CRC(X) | LA (X) GROUP |
| 1 | CRC(1) | COM(1) | | LA (1) GROUP |
| ... | ... | ... | ... | |
| L | CRC(L) | COM(L) | | LA (L) GROUP |
| L | CRC(L+1) | COM(L+1) | | LA (L+1) GROUP |
| ... | ... | ... | ... | |
| N-1 | CRC(N-1) | COM(N-1) | | LA (N-1) GROUP |
| N | CRC(N) | COM(N) | | LA (N) GROUP |
| ... | ... | ... | ... | |
| | CRC(X-3) | COM(X-2) | | LA (X-3) GROUP |
| | CRC(X-2) | COM(X-2) | | LA (X-2) GROUP |
| | CRC(X-1) | COM(X-1) | | LA (X-1) GROUP |

RETURN AREA 11R

| | | |
|---|---|---|
| 0 | CRC'(X) | COM(X) |
| 1 | CRC'(1) | COM(1) |
| ... | ... | ... |
| L | CRC'(L) | COM(L) |
| | CRC'(L+1) | COM(L+1) |
| ... | ... | ... |
| N-1 | CRC'(N-1) | COM(N-1) |
| N | CRC'(N) | COM(N) |
| | | |
| | CRC'(X-2) | COM(X-2) |
| | CRC'(X-1) | COM(X-1) |

DRIVE CM 35

DATA STORAGE SPACE 37

| | |
|---|---|
| 0 | DATA"XB"(X) |
| 1 | DATA"A"(1) |
| ... | ... |
| l+1 | DATA"A"(L) |
| | DATA"A"(2L) |
| ... | ... |
| n-1 | DATA"A"(N) |
| | DATA"Z"(M) |
| | DATA"XX"(X-1) |
| | DATA"XA"(X) |

CRC/COM STORAGE SPACE 39

| | | |
|---|---|---|
| 0 | CRC'(X) | COM(X) |
| 1 | CRC'(1) | COM(1) |
| ... | ... | ... |
| l-1 | CRC'(L) | COM(L) |
| | CRC'(L+1) | COM(L+1) |
| ... | ... | ... |
| n-1 | CRC'(N-1) | COM(N-1) |
| n | CRC'(N) | COM(N) |
| ... | ... | ... |
| | CRC'(X-2) | COM(X-2) |
| | CRC'(X-1) | COM(X-1) |

CM 130

| 131 | |
|---|---|
| | DATA"XB"(X) |
| | DATA"B"(0) |
| | DATA"A"(N+1) |
| | DATA"A"(N) |
| | DATA"B"(0) |
| | DATA"B"(M) |
| | DATA"Z"(M) |
| | DATA"XA"(X) |

FIG. 13A
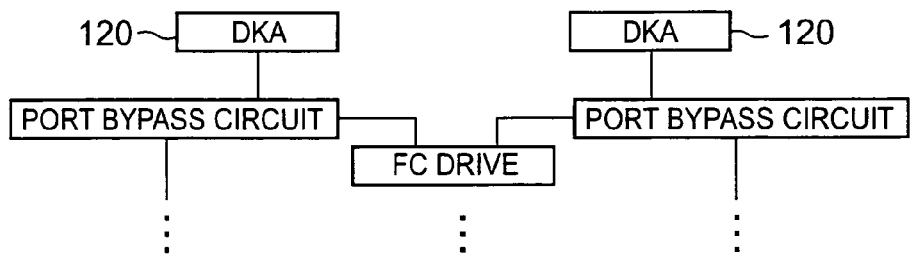
FIG. 13B
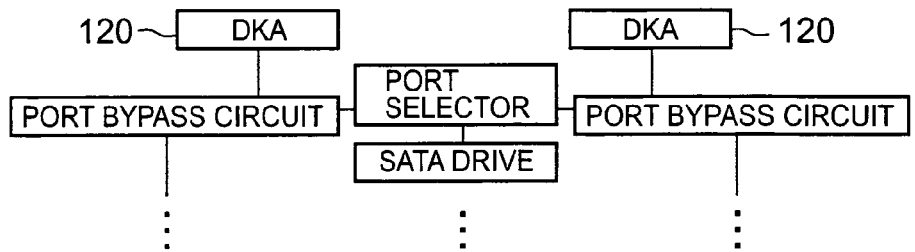
FIG. 13C
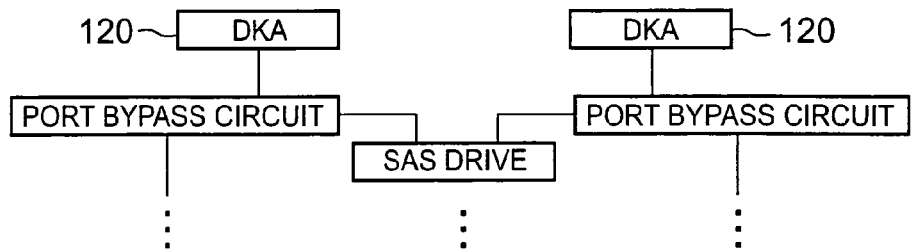
FIG. 13D
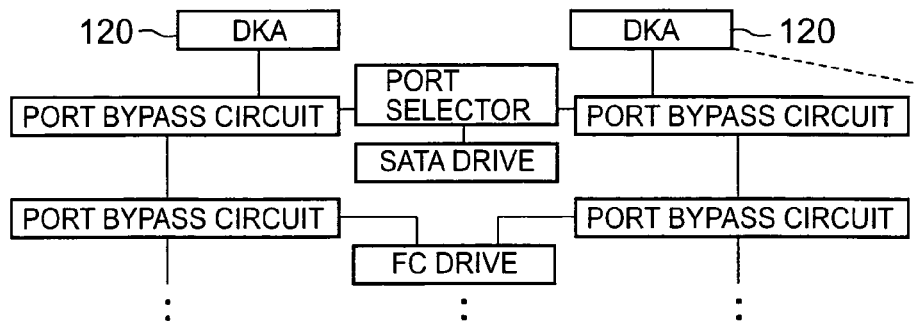
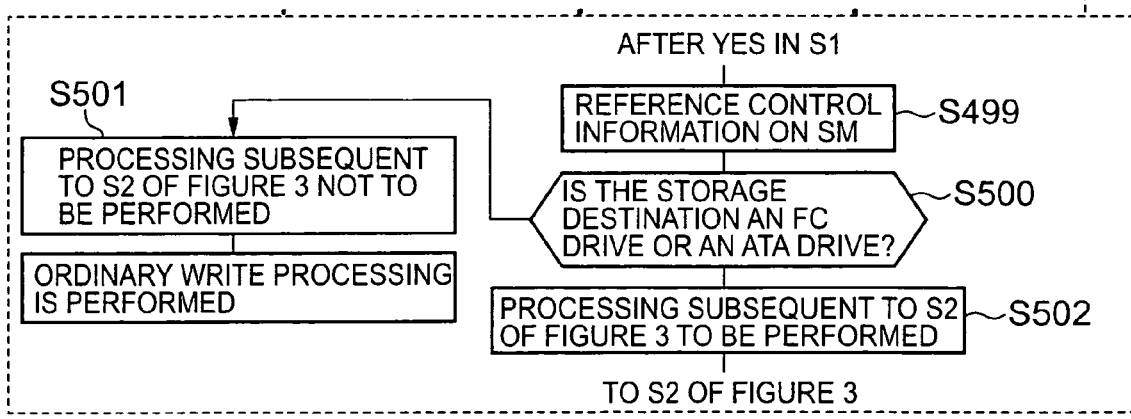

STORAGE CONTROL DEVICE AND METHOD FOR DETECTING WRITE ERRORS TO STORAGE MEDIA

CROSS-REFERENCE TO PRIOR APPLICATION

This application relates to and claims priority from Japanese Patent Application No. 2004-322307, filed on Nov. 5, 2004, the entire disclosure of which is incorporated herein by reference.

BACKGROUND OF THE INVENTION

1. Field of the Invention

The present invention relates to storage control techniques whereby data is written to storage media such as a hard disk and in particular relates to techniques for detecting write errors for the storage media.

2. Description of the Related Art

For example, storage control devices comprising a storage media device are known. An example of a storage control device of this type is a disk array device in which a plurality of disk devices are arranged. In such a storage control device, for example a data write command or read command (hereinbelow referred to as an IO request) is received from a host device and, in response to this IO request, data is written to the storage media or one or other of reading from the storage media or returning read data to the host device is performed. With a storage control device of this type, by employing for example an LRC (longitudinal redundancy check), matching of the data that is written to the storage media and the data that is read from the storage media can be guaranteed (see for example paragraphs 2 to 4 of Laid-open Japanese Patent Application No. 2000-347815).

SUMMARY OF THE INVENTION

With the technique described above, occurrence of an error in writing to the storage media can be detected when data is written to the storage media and this data, that had been written, is read. However, in this case, since error-free data is no longer left on the storage control device, error-free data must be restored from the RAID group by recalculating (by for example the technique of employing parity data at RAID level 5). If processing for restoring data is performed, the number of IO requests processed per unit time is decreased. In other words, there is a deterioration in performance of the storage control device.

One object of the present invention is therefore to avoid this deterioration in performance of the storage control device that results from the need to detect occurrence of errors on writing to the storage media.

Other objects of the present invention will become apparent from the following description.

A storage control device according to a first aspect of the present invention (hereinbelow referred to as a "first storage control device") is a device that receives write data from a host device that transmits the write data i.e. data to be written and that writes the write data to storage media. This storage control device comprises a storage media device comprising storage media that stores data, a cache region that temporarily stores the write data received from the host device, a storage media adaptor that acquires the write data stored in this cache region from the cache region and transfers the write data that has thus been acquired to the storage media device, and a processor. The storage media adaptor comprises a data buffer that accumulates write data acquired from the cache region, a first comparison object generating unit that generates a first comparison object in respect of K items of write data when at least K items (where K is an integer of 1 or more) of write data have been accumulated in the data buffer, a first comparison object storage region that stores the first comparison object that was thus generated, and an adaptor transmitter, which is a transmitter that transmits a data frame including the K items of write data to the storage media device. The storage media device comprises a storage media receiver that is a receiver that receives the data frame from the storage media adaptor, a data storage region that respectively comprises a plurality of sub-regions that store at least one item of write data and addresses for specifying the sub-regions and accumulates in at least one sub-region of this plurality of sub-regions K items of write data contained in the received data frame, an address designating unit that designates the start address for reading from the plurality of addresses of the data storage region, a storage media writing unit that reads write data from the sub-region indicated by the designated address and writes the write data that has thus been read in the storage media, a second comparison object generating unit that, when K items of write data are read from the data storage region, generates a second comparison object in respect of the K items of write data that have thus been read, a second comparison object storage region that stores the generated second comparison object, and a storage media transmitter that is a transmitter that transmits the second comparison object stored in the second comparison object storage region to the storage media adaptor. The storage media adaptor further comprises an adaptor receiver that is a receiver that receives the second comparison object, and a comparator that compares the received second comparison object with the first comparison object stored in the first comparison object storage region. If, as a result of the comparison performed by the comparator, it is found that the received second comparison object does not match any of the plurality of first comparison objects stored in the first comparison object storage region, the processor causes the storage media adaptor to acquire from the cache region the K items of write data that were previously transmitted. The adaptor transmitter then retransmits to the storage media device the data frame including the acquired K items of write data.

The processor may be for example a microprocessor or may be a service processor provided in the storage control device. The processor may for example be mounted in the storage media adaptor or may be mounted in some other location than the storage media adaptor.

Any type of storage media may be adopted so long as it is capable of storing data. For example, the storage media may be a hard disk, semiconductor memory or magneto-optical disk. Also, the storage media device, for example in the case where the storage media is a hard disk, may be the hard disk drive itself or may be a device comprising a hard disk drive.

In a first embodiment of the first storage control device, if, as a result of the comparison by the comparator, it is found that the received second comparison matches any one of the plurality of first comparison objects stored in the first comparison object storage region, the processor then erases the K items of write data corresponding to this first comparison object from the cache region.

In a second embodiment of the first storage control device, the storage control device in the first embodiment comprises a channel adaptor and a shared storage region. The channel adaptor comprises a first processor, receives the write data from the host device, and writes the write data that has thus been received in the cache region. The shared storage region is a storage region that is accessible by both the channel adaptor and the storage media adaptor. The storage media adaptor comprises a second processor. If, as a result of the comparison performed by the comparator, it is found that the received second comparison object matches any one of the plurality of first comparison objects stored in the first comparison object storage region, the second processor writes information indicating the fact that a match has been achieved (for example information indicating OK or a deletion request for K items of write data corresponding to the matching first comparison object) in the shared storage region. If the first processor detects that such information indicating that a match has been achieved is stored in the shared storage region, the first processor deletes the K items of write data corresponding to this first comparison object from the cache region.

In a third embodiment of the first storage control device, the first comparison object and the second comparison object are data groups including code for error detection in respect of the K items of write data (for example CRC (cyclic redundancy check) code).

In a fourth embodiment of the first storage control device, the first comparison object storage region stores first item of identification information for identifying at least one first comparison object from a plurality of first comparison objects. The storage media transmitter transmits at least one second comparison object and a second item of identification information corresponding to the at least one second comparison object to the storage media adaptor. The comparator compares the at least one second comparison object with the at least one first comparison object identified from the first item of identification information matching the second item of identification information.

In a fifth embodiment of the first storage control device, in the fourth embodiment, the first item of identification information includes a frame number indicating the transmission sequence number of the data frame including the K items of write data corresponding to the first comparison object. The second item of identification information includes the frame number associated with the second comparison object.

In a sixth embodiment of the first storage control device, the storage media transmitter transmits to the storage media adaptor an information group including a plurality of second comparison objects. The data size of the information group is no more than the data size of the data frame transmitted by the adaptor transmitter.

In a seventh embodiment of the first storage control device, in the sixth embodiment, the first comparison object storage region stores a first item of identification information for identifying a first comparison object from the plurality of first comparison objects. The storage media transmitter transmits to the storage media adaptor an information group including a plurality of sets of the second comparison object and second item of identification information corresponding to the second comparison object. The comparator compares the second comparison objects contained in the information group with the first comparison object identified from the first item of identification information matching the second item of identification information corresponding to this second comparison object.

In an eighth embodiment of the first storage control device, the storage media device is a hard disk device. The hard disk device may be a hard disk drive itself or a device comprising a hard disk drive. The hard disk drive may be an ATA drive.

In a ninth embodiment of the first storage control device, the storage media device is a hard disk device. The hard disk device may be a hard disk drive itself or a device comprising a hard disk drive. The storage control device comprises a high reliability hard disk device and a hard disk device of lower reliability than the high reliability hard disk device. The storage media adaptor is connected with both the high reliability hard disk device and the hard disk device of lower reliability. The high reliability hard disk device may be a high reliability drive itself or a device comprising the high reliability drive. The lower reliability hard disk device may itself be a drive of lower reliability than the high reliability drive or may be a device comprising such a drive. The comparator performs the comparison in the case where the transmission destination of the write data is the lower reliability hard disk device. In other words, in this ninth embodiment, the lower reliability hard disk device for example comprises the second comparison object generating unit, the second comparison object storage region and the storage media transmitter; if the transmission destination of the write data is the lower reliability hard disk device, the storage media adaptor can thus receive the second comparison object.

A storage control method according to the second aspect of the present invention is a storage control method that is executed by a storage control device that receives write data from a host device that transmits write data i.e. data to be written and that writes this write data to storage media. The storage control device comprises a storage media storage device provided with storage media. The storage media storage device comprises a data storage region that respectively comprises a plurality of sub-regions that store at least one item of write data and addresses for specifying the sub-regions. In this case, the storage control method comprises: a step of receiving write data from a host device; a step of writing the received write data in a cache region where write data is temporarily stored; a step of generating a first comparison object in respect of K items of write data (where K is an integer of 1 or more) that are written to the cache region; a step of writing the generated first comparison object to the comparison object storage region; a step of generating a data frame containing the K items of write data and transmitting the generated data frame to a storage media device having storage media; a step of writing the K items of write data included in the data frame received by the storage media device in at least one sub-region of the plurality of sub-regions in the data storage region; a step of designating the start address for reading from the plurality of addresses of the data storage region; a step of reading write data from the sub-region indicated by the designated address and writing the write data that has thus been read to the storage media; a step of generating a second comparison object in respect of the K items of write data that have thus been read, in the case where K items of write data are read from the data storage region; a step of writing the generated second comparison object to a second comparison object storage region; a step of transmitting a second comparison object stored in the second comparison object storage region; a step of comparing the transmitted second comparison object with the first comparison objects stored in the first comparison object storage region; and a step of, if the comparison result is that the second comparison object does not match any of the plurality of first comparison objects stored in the first comparison object storage region, acquiring the K items of write data that were previously transmitted from the cache region and retransmitting the data frame including the acquired K items of write data to the storage media device.

A storage control device according to a third aspect of the present invention (hereinbelow referred to as a "third storage control device") is a storage control device that receives write data from a host device that transmits the write data i.e. data to be written and that writes the write data to storage media.

This storage control device comprises storage media that stores data, a cache region that temporarily stores the write data from the host device, a cache acquisition unit that acquires K items of write data (where K is an integer of 1 or more) written to the cache region, a first comparison object generating unit that generates a first comparison object in respect of the K items of write data, a first comparison object storage region that stores the first comparison object that was thus generated, a data storage region that respectively comprises a plurality of sub-regions that store at least one item of write data, and addresses for specifying the sub-regions and stores the K items of write data in at least one sub-region of this plurality of sub-regions, an address designating unit that designates the start address for reading from the plurality of addresses of the data storage region, a storage media writing unit that reads write data from the sub-region indicated by the designated address and writes the write data that has thus been read in the storage media, a second comparison object generating unit that, when K items of write data are read from the data storage region, generates a second comparison object in respect of the K items of write data that have thus been read, and a comparison unit that compares the generated second comparison object with the first comparison object stored in the first comparison object storage region. If, as a result of the comparison by the comparison unit, it is found that the second comparison object matches none of the plurality of first comparison objects stored in the first comparison object storage region, the cache acquisition unit acquires K items of write data from the cache region. The data storage region stores the K items of write data that are thus acquired.

In a first embodiment of the third storage control device, the third storage control device further comprises a data deletion unit that deletes K items of write data corresponding to the first comparison object from the cache region if, as a result of the comparison performed by the comparison unit, it is found that the received second comparison object matches any one of the plurality of first comparison objects stored in the first comparison object storage region.

In a second embodiment of the third storage control device, the first comparison object and the second comparison object are data groups including code for error detection in respect of the K items of write data.

In a third embodiment of the third storage control device, the first comparison object storage region stores first item of identification information for identifying a first comparison object from a plurality of first comparison objects. The third storage control device further comprises a specifying unit for specifying, from the first comparison object storage region, a first item of identification information matching a second item of identification information corresponding to the second comparison object. The comparison unit compares the first comparison object identified from the specified first item of identification information and the second comparison object corresponding to the second item of identification information.

In a fourth embodiment of the third storage control device, in the third embodiment, the third storage control device further comprises a storage media device comprising the storage media and a data frame transmission unit that generates a data frame including K items of write data in the cache region and transmits this generated data frame to the storage media device. The first item of identification information includes a frame number indicating the transmission sequential number of the data frame including the K items of write data corresponding to the first comparison object. The second item of identification information includes a frame number associated with the second comparison object.

Of the first storage control device and the third storage control device, in at least the third storage control device, the various units comprised by the storage control device can be realized by software, hardware (computer program) or a combination of these.

BRIEF DESCRIPTION OF THE DRAWINGS

FIG. 1 shows an outline of first copy processing performed by a data-processing system according to an embodiment of the present invention and FIG. 1B shows an outline of second copy processing performed by this data processing system;

FIG. 5 shows how a first information set is written in a transmission area;

FIG. 8 shows how sets of CRC' and COM of a prescribed number or more are written to the CRC'/COM storage space;

FIG. 9 shows how CRC' in a return area and CRC in a transmission area are compared;

FIG. 10 shows how K data units corresponding to CRC with which matching is obtained as a result of comparison are deleted from the cache memory;

FIG. 11 shows how wraparound is performed when the cache region, transmission area, return area, data storage space and CRC'/COM storage space are respectively full;

FIG. 13A shows an example of the case where a plurality of hard drive devices are FC drives in a practical example of an embodiment of the present invention; FIG. 13B shows an example where a plurality of hard disk devices are SATA drives in this practical example; FIG. 13C shows an example of the case where in this practical example, a plurality of hard disk devices are SAS drives; and FIG. 13D shows an example of the case where, in this practical example, both FC drives and ATA drives are present in the plurality of hard disk devices.

DESCRIPTION OF THE PREFERRED EMBODIMENTS

An embodiment of the present invention is described below with reference to the drawings.

Figure 12:
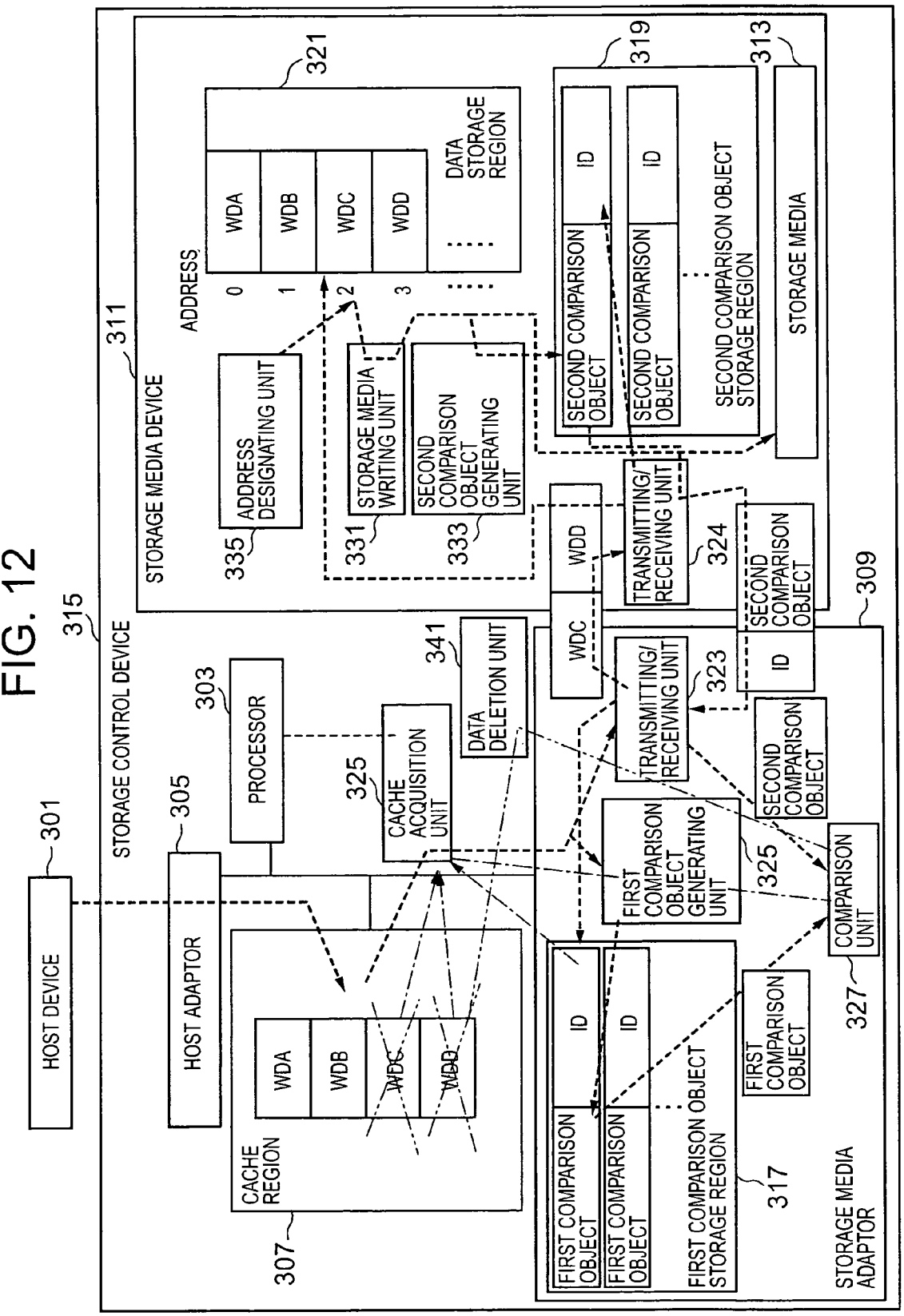
FIG. 12 shows an outline of a first embodiment of the present invention.

FIG. 12 shows an outline of an embodiment of the present invention.

A storage control device 315 is connected with a host device 301 that transmits write data (hereinbelow abbreviated to "WD") i.e. data to be written. The storage control device 315 comprises a host adaptor 305 constituting an interface device in respect of the host device 301, a processor 303 that controls the operation of the storage control device 305, a cache region 307 that stores write data from a host device 301, a storage media device 311 comprising storage media 313, and a storage media adaptor 309 that transfers the write data on the cache region 307 to the storage media device 311. The storage media device 311 comprises a data storage region 321 in which write data that is written to the storage media 313 is written. In the data storage region 321, there are provided a plurality of addresses, respectively corresponding to a plurality of sub-memories. Write data is read from a designated address and the write data that is thus read is written to the storage media 313.

For example, as the storage media 313, a hard disk may be employed. As the storage media device 311, a hard disk drive itself, or a device comprising a hard disk drive may therefore be employed. The hard disk drive may be a drive of a high reliability type, in which the frequency of occurrence of write errors to the disk is low (for example a drive having a fiber channel interface) or may be a drive of a type of low reliability (for example a drive having an ATA interface) in which the frequency of occurrence of write errors is higher than in the case of the foregoing type of device. Typically, low reliability drives are cheaper, so, when it is desired to keep the cost of the storage control device 315 low, drives of low reliability will tend to be adopted.

Specifically, in for example the case of a low reliability drive, write errors to the disk tend to occur more frequently than in the case of a high reliability drive. When write errors to the disk occur, the method may be considered of for example restoring the data by recalculation from the RAID group (by for example the technique of employing parity data in RAID level 5) and rewriting the restored data to the disk. However, when processing to restore the data is executed, the number of IO requests that are processed per unit time is decreased.

Accordingly, in this embodiment, the performance deterioration of the storage control device 315 is suppressed by the techniques described below.

Write data that is transmitted from the host device 301 is written to the cache region 307. The write data on the cache region 307 is acquired by a cache acquisition unit 325. The K items (where K is an integer of 1 or more) of write data that are acquired by the cache acquisition unit 325 are transmitted from a transmitting and receiving unit 323 of the storage media adaptor 309 to the storage media device 311. The cache acquisition unit 325 may be a computer program that is read by the processor 303, may be a hardware circuit, or may be a combination of a computer program and hardware.

The first comparison object generating unit 325 generates a first comparison object in respect of the K items of write data acquired from the cache region 307 and writes the first comparison object that has been thus generated to the first comparison object storage region 317. For example, the first comparison object generating unit 325 calculates a CRC (a cyclic redundancy check) using the K items of write data and writes the CRC that has thus been calculated in the first comparison object storage region 317.

The first comparison object and the ID for this first comparison object are recorded in the first comparison object storage region 317. For example, the transmitting and receiving unit 323 generates a data frame including K items of write data and the data frame that is thus generated is transmitted to the storage media device 311; however, in this case, the ID includes a frame number indicating the transmission sequential number of the data frame and a WD sub-ID expressing the identity of the write data that was used to create the first comparison object corresponding to this ID. In addition, the ID may include a sequence sub-ID. In this way, it is possible to tell from the ID which WD is included in which data frame of which sequence. The ID may for example be written by the transmitting and receiving unit 323.

The transmitting and receiving unit 324 of the storage media device 311 receives a data frame from the storage media adaptor 309. The various items of write data in the data frame are stored in the data storage region 321.

An address designating unit 335 designates an address of the data storage unit 321. The address designating unit 335 can be implemented for example by firmware of the storage media device 311. For example a single address of the data storage region 321 stores a single item of write data.

The storage media write unit 331 reads the write data from the designated address and writes the write data that has been thus read in the storage media 313. When K items of write data have been sequentially read from the designated address of the data storage region 321, the second comparison object generating unit 333 generates a second comparison object in respect of these K items of write data and writes the second comparison object that has been thus generated in the second comparison object storage region 319. This second comparison object may also be a CRC.

The second comparison object and its ID may be written in the second comparison object storage region 319. This ID may for example be written by the transmitting and receiving unit 324. This ID may contain for example the frame number of the data frame but need not contain a WD sub-ID expressing which write data was used to create the second comparison object corresponding to this ID (for example a logical block address expressing the location where the WD is stored).

The transmitting and receiving unit 324 transmits to the transmitting and receiving unit 323 a set consisting of the second comparison object and its ID. The set that is thus transmitted may be a single set or a plurality of sets may be transmitted. However, the size of the data that is transmitted from the storage media device 311 should preferably be smaller than the data size of the data frame that is transmitted from the transmitting and receiving unit 323.

The ID corresponding to the ID contained in the set that is received by the transmitting and receiving unit 323 is retrieved from the first comparison object storage region 317. The first comparison object corresponding to the retrieved ID is thereby specified. The comparison unit 327 performs a comparison of the first comparison object that has thus been specified and the second comparison object included in the set that has thus been received.

In for example the case where K=2, as shown in FIG. 12, a data frame including write data C and write data D is transmitted and, if the write data C and write data D are read without error from the data storage region 321, since the first comparison object and the second comparison object are created using the write data C and write data D, matching can be obtained as a result of the comparison. However, even though a data frame containing write data C and write data D was transmitted, if, due to for example mis-designation of the address, write data B and write data C are erroneously read from the data storage region 321, since the second comparison object is created using the write data B and write data C whereas the first comparison object was created using the write data C and write data D, a mismatch will be obtained as the comparison result.

If a mismatch is obtained as the comparison result, as shown by the single-dotted chain line in FIG. 12, write data C and write data D are again acquired by the cache acquisition unit 325. Specifically, for example the ID associated with a first comparison object for which no match was obtained specifies the identity of the write data that was used to create this first comparison object; the cache acquisition unit 325 acquires the specified write data C and D from the cache region 307. A data frame including the write data C and D that have thus been acquired is then re-sent from the transmitting and receiving unit 323.

If on the other hand, as shown by the double-dotted chain line in FIG. 12, the result of the comparison is that a match is obtained, the data deletion unit 341 deletes the write data C and D from the cache region 307. Specifically, for example the ID associated with the first comparison object for which a match was obtained specifies the identity of the write data that was used to create this first comparison object and the data deletion unit 341 is thereby enabled to delete these specified write data C and D from the cache region 307.

In this embodiment, the write data that is to be written to the storage media 311 is left in the storage control device 315 until it has been detected whether or not this write data has been correctly written to the storage media 311; if a write error is detected, this can be dealt with by re-using this write data. Consequently, processing for restoring the write data is unnecessary, so adverse effect on the performance of the storage control device 315 is avoided.

Also, in this embodiment, when K items of write data have been written to the storage media 313, a second comparison object is generated in respect of these K items of write data. The second comparison object that is thus generated is returned to the transmitting and receiving unit 323 and a comparison to establish whether or not a write error has been detected is performed. In this way, detection of whether or not a write error has occurred can be performed at a time-point prior to reading of the write data from the storage media 313 in response to an IO request from the host device 301. The set of ID and second comparison object may be immediately returned when this set is written to the second comparison object storage region 319, or such sets may be returned when a certain number of sets have been accumulated. In the former case, whether or not a write error has occurred can be detected at an early time-point; in the latter case, the size of blanks that may be generated in the data frame from the transmitting and receiving unit 324 to the transmitting and receiving unit 323 can be reduced.

The above is the description of this embodiment.

In this embodiment, the various units referred to above such as the first comparison object generating unit 325 may be computer programs or hardware circuits or may be combinations of computer programs and hardware.

Also, at least one of the first comparison object generating unit 325, first comparison object storage unit 317 and two comparison unit of 327 may be provided in the storage media adaptor 309, or may be provided in a separate location from the storage media adaptor 309.

Also, at least one of the second comparison object of generating unit 333 and second comparison object storage unit 319 may be provided in the storage media device 311 or may be provided in a separate location from the storage media device 311.

Also, if the storage media device 311 is itself a hard disk drive or a device comprising such a drive, this hard disk drive may be a high reliability drive (for example a fiber channel drive) or may be a low reliability drive (for example an SAS (Serial Attached SCSI) drive or SATA (Serial ATA) drive). However, a low reliability drive may be more effective since the deterioration of performance of the storage control device 315 is suppressed if the storage control device 315 of this embodiment detects and covers write errors to the storage media.

More specific practical examples of the embodiment described above are described below with reference to the drawings.

PRACTICAL EXAMPLE 1

Figure 1:
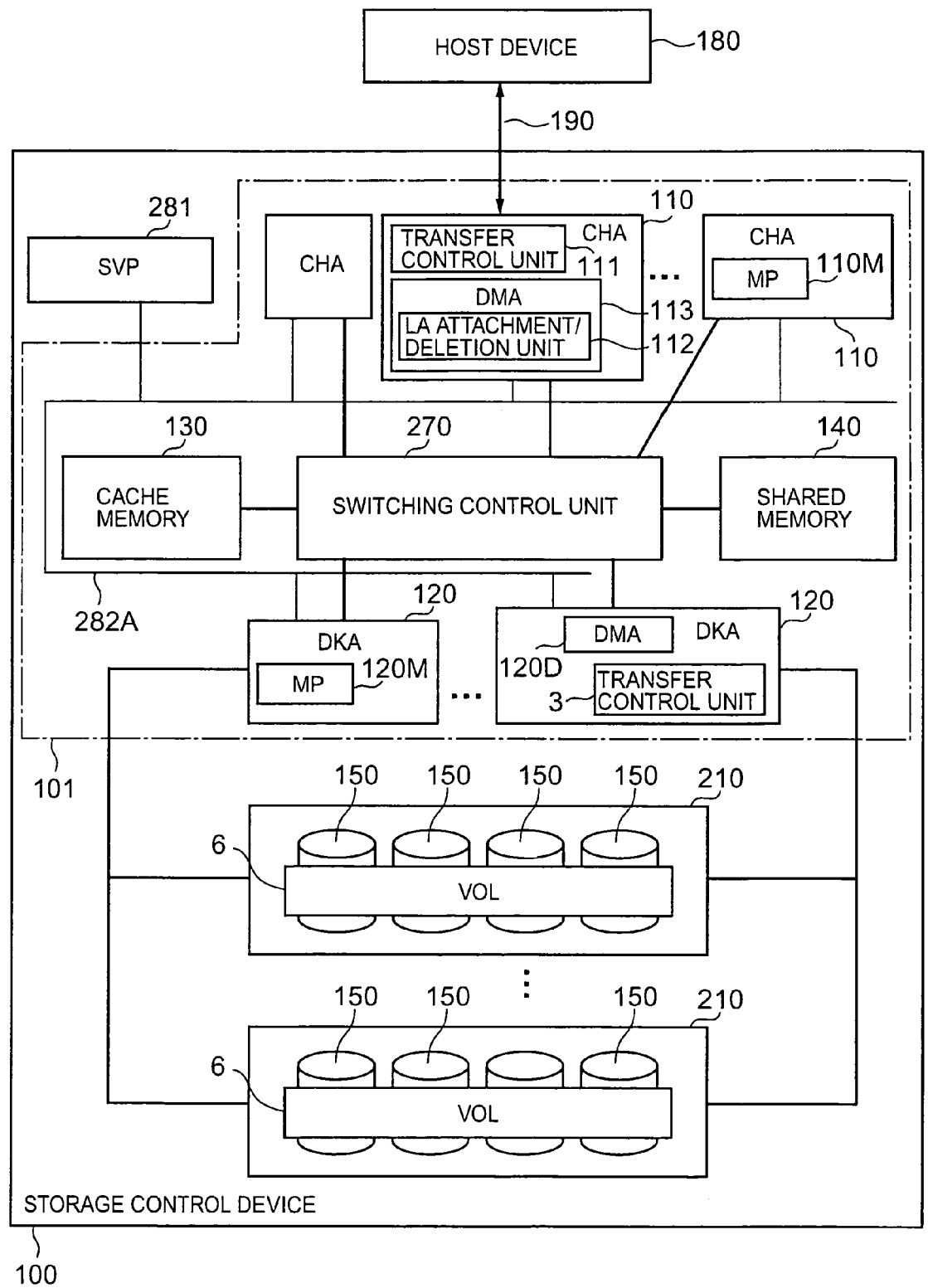

FIG. 1 shows an example of the layout of a storage control device according to a practical example of an embodiment of the present invention.

A storage control device 100 is a disk array device such as for example a RAID (redundant array of independent disks). The storage control device 100 comprises for example a control unit 101 that controls processing that is performed by the storage control device 100, a RAID group 210 and a service processor (SVP) 281. The control unit 101 comprises for example one or a plurality of disk adapters (hereinbelow termed DKA) 120, one or a plurality of channel adaptors (hereinbelow termed CHA) 110, cache memory 130, shared memory 140 and a switching control unit 270.

The RAID group 210 includes a plurality of hard disk devices 150 and provides redundant storage under RAID, such as for example RAID 1 or RAID 5. Each of the hard disk devices 150 may be for example a hard disk drive itself or a device comprising a hard disk drive in a canister (not shown). At least one or more logical volume (hereinbelow called VOL) 6 constituting a logical storage region may be set up on the physical storage region provided by the hard disk devices 150. A plurality of items of write data that are transmitted from the host device 180 may be stored in VOL 6.

The DKAs 120 control data exchange with the hard disk devices 150. The DKAs 120 are constituted for example as microcomputer systems including for example a microprocessor (hereinbelow abbreviated as MP) 120M, ROM and RAM etc. Also, the DKAs 120 may comprise a controller 120D for direct memory access and/or a transfer control unit 3 that controls transfer of data to the hard disk devices 150. A plurality of DKAs 120 may be provided for example within the storage control device 100. The transfer control unit 3 performs block level data transfer with respect to the hard disk devices 150 using for example SCSI or iSCSI.

The CHAs 110 receive write data from the host device 180 through a connecting bus 190. The connecting bus 190 may be a communication network or may be a private bus line. Like the DKAs 120, the CHAs 110 may be constituted as microcomputer systems. For example, each CHA 110 may comprise an MP 110M, DMA controller 113 and transfer control unit 111. The DMA controller 113 comprises an LA addition/deletion unit 112 that either adds an LA (logical block address) to the write data from the host device 180 or deletes an LA from the data transmitted to the host device 180. Hereinbelow, data obtained by adding other data such as an LA to the write data from the host device 180 is denoted as a "data unit".

The cache memory (hereinbelow sometimes written "CM") 130 may be constituted for example of volatile or non-volatile or semiconductor memory. The cache memory 130 can store write data from the host device 180 or write data read from VOL 6.

The shared memory (hereinbelow sometimes written "SM") 140 may be constituted of for example non-volatile or volatile semiconductor memory. The shared memory 140 stores for example various types of commands received from the host device 180 and/or control information employed in controlling the storage control device 100. The commands or control information or the like may be redundantly stored by a plurality of shared memories 140. It should be noted that the cache memory 130 and shared memory 140 may be constituted as respectively separate memories or part of a memory may be employed as a cache memory region while another part of the same memory is employed as a shared memory region.

The switching control unit 270 respectively mutually connects the DKAs 120, CHAs 110, cache memory 130 and shared memory 140. The switching control unit 270 may comprise for example a very high-speed cross switch or the like.

The SVP (service processor) 281 collects and monitors the state of the various units within the storage control device 100 through for example an internal network (such as for example a LAN) 282. The SVP 281 outputs the internal state information that has been thus collected either directly in the form of raw data or as statistically processed data to an external management terminal (not shown). Examples of information that is capable being collected by the SVP 281 include device configuration, power alarms, temperature alarms or input/output rate (for example in IOPS units (IO requests/sec)). The system administrator can perform for example alteration of settings of the RAID configuration or blocking of the processing of various types of packages (for example CHAs 110 or DKAs 120) through the SVP 281 from the management terminal (not shown).

Next, an example of the processing performed by the storage control device 100 will be described. The CHAs 110 receive a write instructions and write data from the host device 180 through the connecting bus 190. The write commands that are received are stored in the shared memory 140 and the received write data is stored in the cache memory 130. The DKAs 120 reference the shared memory 140 from time to time. If a DKA 120 discovers a write command that has not yet been processed that has been stored in the shared memory 140, the DKA 120 reads the right data from the cache memory 130 in accordance with this write command and performs address conversion etc. The DKA 120 writes the write data to the hard disk devices 150 constituting VOL 6 designated by the write command.

The case of processing a read command from the host device 180 will be described. When the CHA 110 receives a read command from the host device 180, the CHA 110 stores this read command in the shared memory 140. When the DKA 120 discovers an unprocessed read command in the shared memory 140, it reads the write data from the hard disk devices 150 constituting the VOL 6 designated by this read command. The DKA 120 stores the write data that has been thus read in the cache memory 130. Also, The DKA 120 reports to the CHA 110 through the shared memory 140 that reading of the requested write data has been completed. The CHA 110 reads the write data from the cache memory 130 and transmits it to the host device 180.

The above is an example of the construction of a storage control device 100 according to the present embodiment. Of course, the storage control device 100 need not be restricted to the construction described above. For example, the storage control device 100 could be constructed by memory in which control information or write data etc can be stored, an interface device (hereinbelow abbreviated to "I/F") for the host device 180, and an I/F for the hard disk device 150 and the control unit (for example CPU) that controls for example communication through these I/F in accordance with information in the memory.

Figure 2:
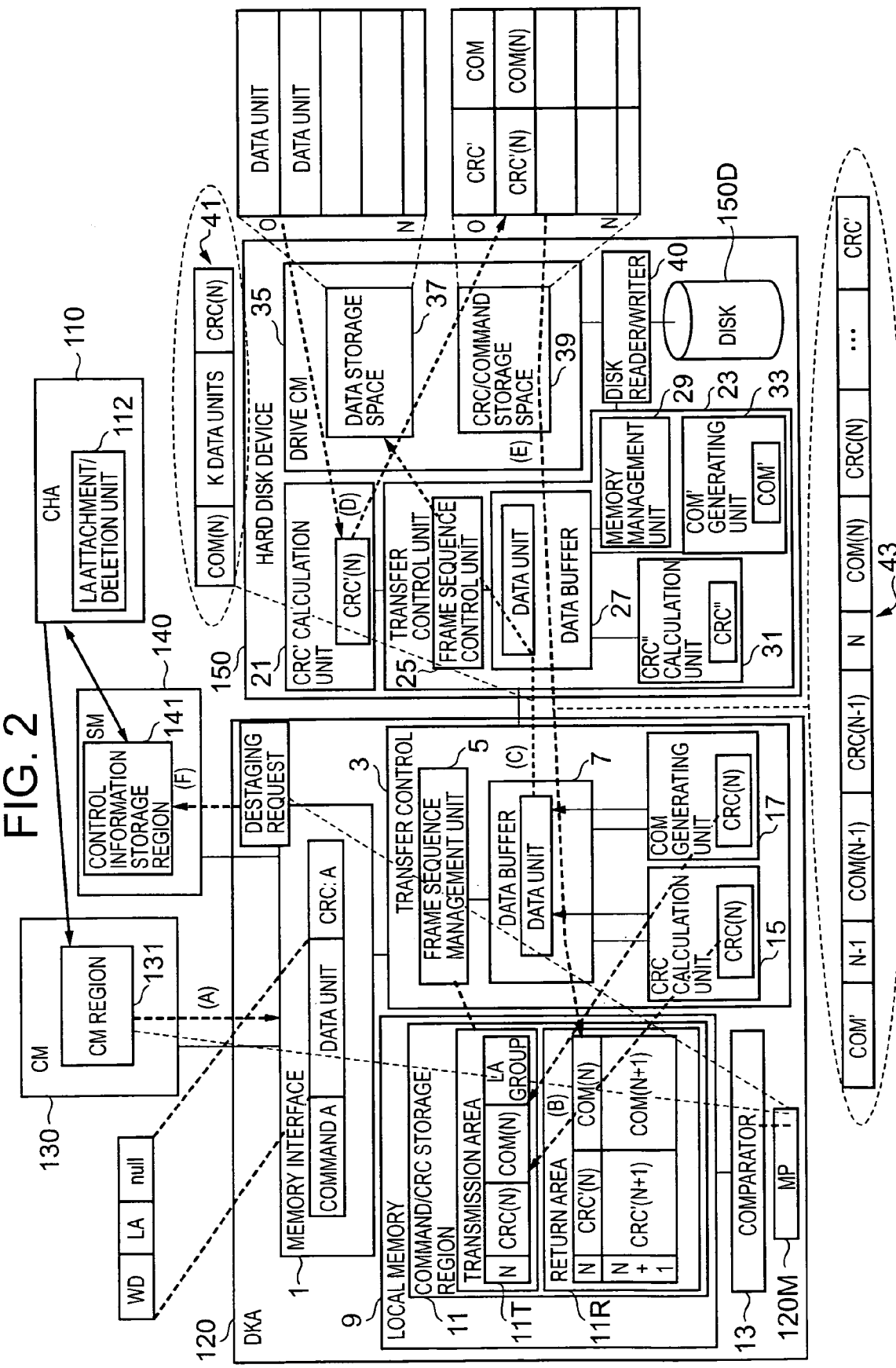
FIG. 2 shows an example of the layout of update data 4.

FIG. 2 shows an example of the construction of a DKA and an example of the construction of a hard disk device.

The DKA 120 is connected for example through a fiber channel loop with a hard disk device 150. The DKA 120 may comprise a memory interface 1, local memory 9, transfer control unit 3 and comparator 13.

The memory interface 1 is an interface device for the CM 130 and/or SM 140 and performs exchange of information with the CM 130 or SM 140.

The local memory 9 can be constructed of for example volatile or non-volatile semiconductor memory. The local memory 9 comprises a COM/CRC storage region 11. A COM/CRC capable region 11 includes a transmission area 11T and return area 11R. The transmission area 11T records one or a plurality of first information sets including the frame number, CRC, and commands for the hard disk device (hereinbelow denoted by COM). The return area 11R records one or a plurality of second information sets comprising the frame number COM and CRC' included in the return frame 43.

The return frame 43 is the frame that is transmitted from the hard disk device 150 to the DKA 120. The return frame 43 includes a command in respect of the DKA 120 (hereinbelow denoted as COM'), one or a plurality of second information sets (i.e. information sets including the frame number, COM and CRC'), and the CRC in this return frame 43 (hereinbelow denoted by CRC").

A transmission frame 41 is provided for a return frame 43. The transmission frame 41 is the frame that is transmitted to the hard disk device 150 from the DKA 120. The transmission frame 41 includes the COM, K data units, and K CRCs that are generated from these data units. A data unit includes write data from the host device 180 and an LA (LA added by CHA 110) in respect of this write data. Also, the data unit may include null data in order to make the data unit of a prescribed size.

Hereinbelow, if simply CRC is referred to, this indicates a CRC that is generated using K data units transmitted to the hard disk device 150 from the DKA 120. In contrast, if CRC' is referred to, this denotes a CRC that is generated using K data units that are read from the drive cache memory 35, to be described, in the hard disk device 150. Also, if CRC" is referred to, this denotes a CRC in the return frame 43.

The transfer control unit 3 comprises a frame sequential order management unit 5 that manages the transmission sequential order of the transmission frames 41, a data buffer 7 having a capacity capable of accumulating at least K data units, a CRC calculation unit 15 that calculates a CRC from K data units accumulated in the data buffer 7, and a COM generating unit 17 that generates the COM that is included in the transmission frame 41. The frame sequential order management unit 5, CRC calculation unit 15 and COM generating unit 17 may be hardware circuits, computer programs or a combination of these.

The comparator 13 is a device that compares the CRC and COM in a given first information set in the transmission area 11T and the CRC' and COM in the second information set in the return area 11R corresponding to this given first information set and outputs the result. The comparator 13 can output the result of the comparison for example to the MP 120M.

A hard disk device 150 comprises a drive cache memory (hereinbelow abbreviated as drive CM) 35, a transfer control unit 23, a CRC' calculation unit 21, a disk reader/writer 40 and a disk 150D.

The drive CM 35 may be constituted for example by volatile or non-volatile semiconductor memory. The drive CM 35 comprises a data storage space 37 and CRC'/COM storage space 39. The data storage space 37 comprises a plurality of sub-spaces for storing one or a plurality of data units and a plurality of addresses for respectively designating the plurality of sub-spaces. The CRC'/COM storage space 39 comprises a plurality of sub-spaces for storing third information sets including CRC' and COM and a plurality of addresses for respectively designating the plurality of sub-spaces.

The transfer control unit 23 comprises a frame sequential order management unit 25 that manages the transmission sequential order of the transmission frames 41, a data buffer 27 having a capacity capable of accumulating at least K data units, a memory management unit 29 that manages the drive CM 35, a CRC" calculation unit 31 that calculates the CRC" in the return frame 43, and a COM' generating unit 33 that generates the COM' included in the return frame 43. The frame sequential order management unit 25, CRC" calculating unit 31, memory management unit 29, and COM' generating unit 33 may be hardware circuits, computer programs or a combination of these. The memory management unit 29 performs for example designation of the starting address for reading of the data storage space 37 or monitoring how many unread third information sets have been accumulated in the CRC'/COM storage space 39.

The CRC' calculating unit 21 calculates a CRC' from K data units that have been written to the disk 150 DB after being read from the drive CM 35.

The disk reader/writer 40 starts to read data units from the read start address designated in respect of the data storage space 37 and writes the data units that have been read to the disk 150D. When the disk reader/writer 40 has read a data unit from the read start address, it reads the data unit from the next address. By repeating this process, the disk reader/writer 40 can write a plurality of data units to the disk 150D. The disk reader/writer 40 comprises for example a head that is positionally aligned on the disk and a position control unit that controls the position of the head.

Figure 3:
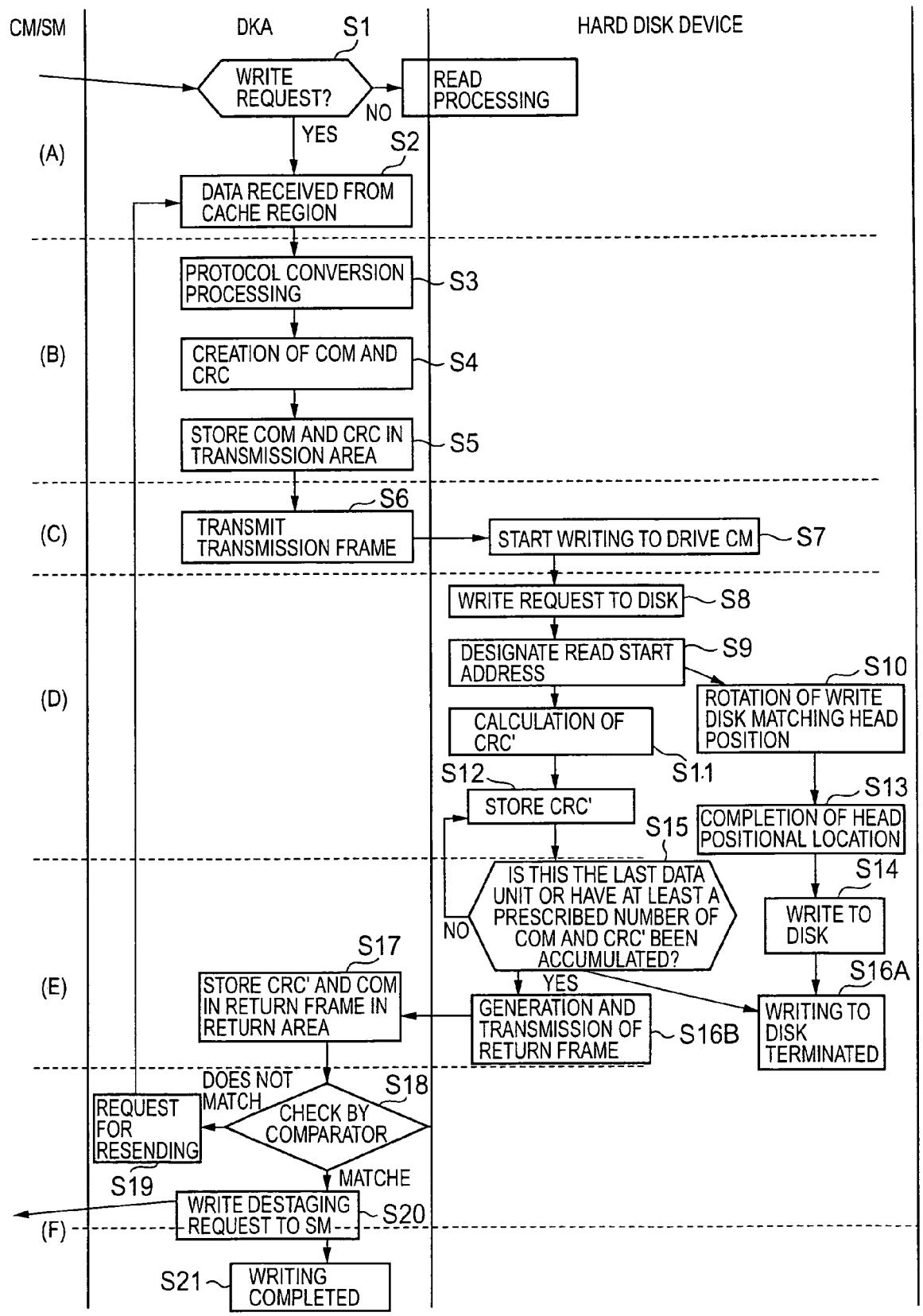
FIG. 3 shows an example of the layout of write data VOL and JNLVOL and in particular shows an example of the layout represented by update data 4 shown by way of example in FIG. 2.

FIG. 3 shows an example of the flow of processing up to where presence/absence of an error in writing to the disk is detected and an example of the flow of processing that is performed in response to the result of this detection. These processing flows are described below with reference to FIG. 2 and FIG. 3. A description is also given of which storage regions are updated in what way in these processing flows, with reference to FIG. 4 to FIG. 11 as appropriate. (A) to (F) in FIG. 2 respectively correspond to (A) to (F) in FIG. 3. Also, in FIG. 4 to FIG. 11, a data unit is denoted by "DATA" and the data unit that is contained in the return frame 41 whose frame number is N is denoted by "DATA (N)". Also, in FIG. 4 to FIG. 11, the COM that is included in the transmission frame 41 whose frame number is N is denoted by COM (N), the CRC that is contained in this transmission frame 41 is denoted by CRC (N) and the CRC' that is generated from the K data units that should be included in this transmission frame 41 is denoted by CRC'(N). The reason for saying "that should be included" is that it is possible that K data units other than the K data units that ought to be read out might be read out due to some reason such as erroneous designation of the address in the data storage space 37.

Figure 4:
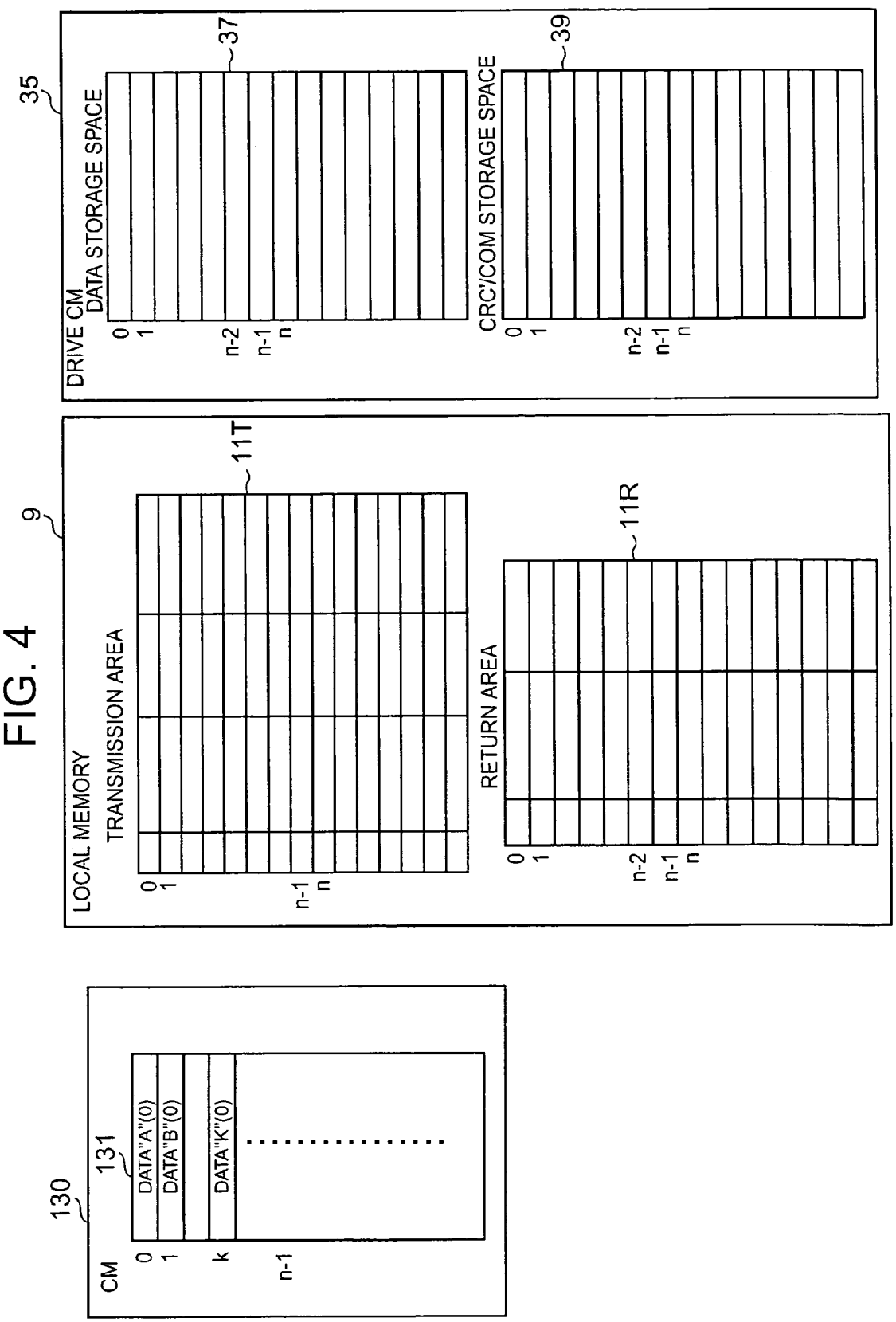
FIG. 4 shows how a plurality of data units are written in a cache region.

The CHA 110 generates a data unit by adding an LA to the write data received from the host device 180; as shown in FIG. 4, the data unit that is thus generated is written to a prescribed cache region 131 on the CM 130. Also, the CHA 110 writes the write request for writing of this data unit to the disk to a prescribed control information storage region 141 on the SM 140.

The DKA 120 detects unprocessed requests by periodically referencing the control information storage region 141. If such a request is a read request (NO in step S1), for example the read processing described above is performed; if the request is a write request (YES in S1), execution of processing corresponding to this write request is commenced.

First of all, the memory interface 1 of the DKA 120 acquires a data unit from the cache region 131 (S2). To this data unit, there are added the command (denoted by "command A" in FIG. 2) that is passed between the CM 130 and DKA 120 and the CRC (denoted by "CRC: A" in FIG. 2). This command and CRC are discarded after being received by the memory interface 1. The data unit that is received by the memory interface 1 is accumulated in the data buffer 7 of the transfer control unit 3.

When K data units have been accumulated in the data buffer 7, the transfer control unit 3 commences protocol conversion processing (S3) comprising processing to generate a transmission frame 41 in accordance with the transmission protocol to the hard disk device. For example, when a transmission frame 43 of frame number 0 is transmitted, the CRC calculation unit 15 calculates the CRC (0) from the K data units contained in this transmission frame 43 and the COM generation unit 17 generates COM (0) that is contained in this transmission frame 43 (S4). The CRC (0) that has been thus calculated and the COM (0) that has been generated are stored in the transmission area 11T (S5). Also, at this point, for example the frame sequential order management unit 5 associates the frame number 0 with the set of CRC (0) and COM (0) in the transmission area 11T. Also, for example the MP 120M associates an LA group with the set of CRC (0) and COM (0) on the transmission area 11T. What is referred to here as an "LA group" is K LAs that are respectively included in the K data units that are employed in the generation of the CRCs in order to make it possible to designate from which K data units the CRCs are to be generated. In FIG. 4 to FIG. 11, the LA group corresponding to CRC (N) is denoted by a "LA (N) group". This way of writing the frame number 0, CRC (0), COM (0) and LA (0) group is shown in FIG. 5.

The transfer control unit 3 generates a transfer frame 41 including the COM that has thus been generated (for example COM (0)), the calculated CRC (for example CRC (0)) and the K data units that were employed for calculation of this CRC, and transmits this transmission frame 41 to the hard disk device 150 (S6).

Figure 6:
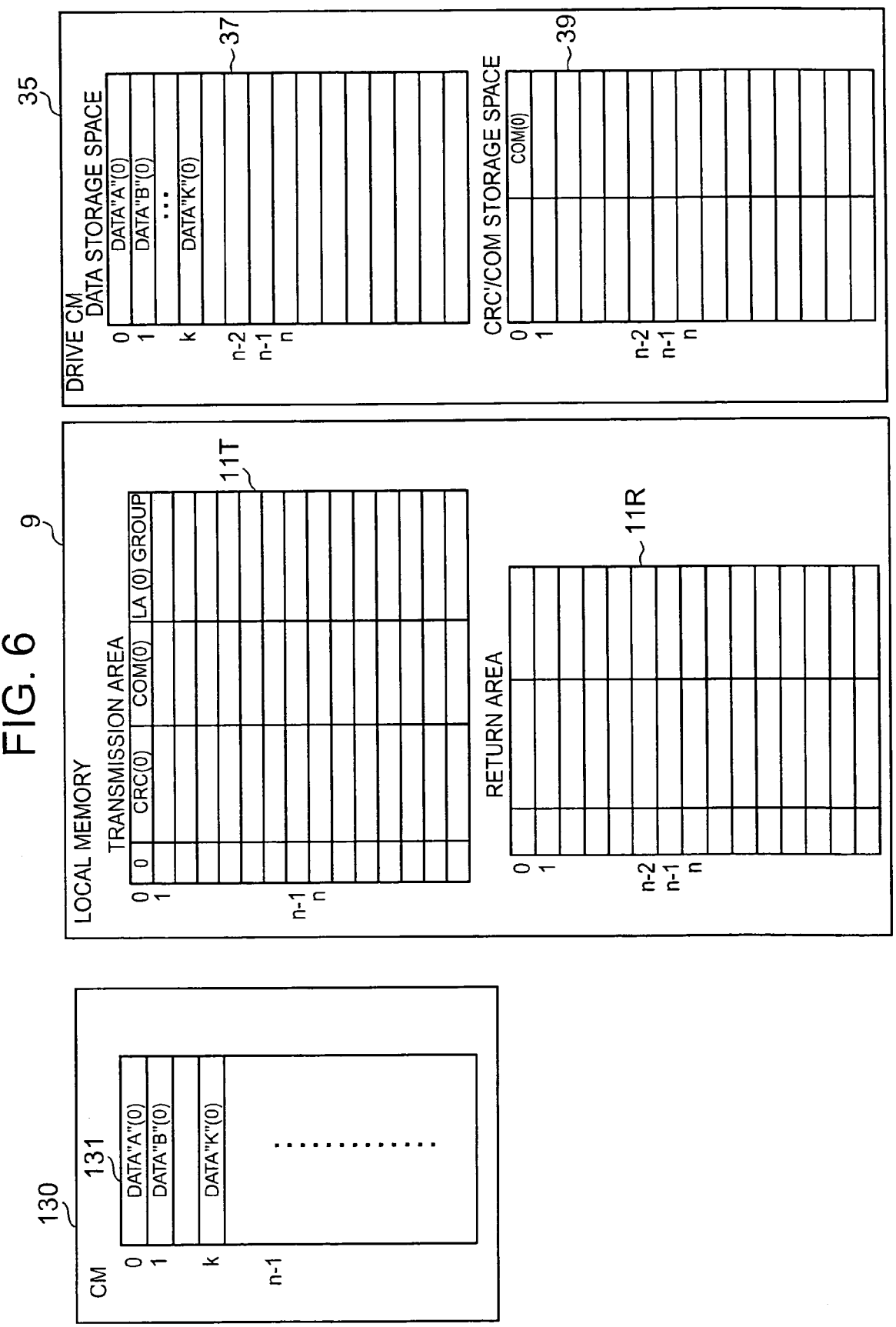
FIG. 6 shows how K data units included in a given data frame are written to a data storage space and how COM included in this data frame is written to the CRC'/COM storage space.

The transfer control unit 23 of the hard disk device 150 receives the transfer frame 41 and respectively stores (S7) the K data units that are contained in the transmission frame 41 in K sub-spaces in the data storage space 37. Also, the transmission control unit 23 stores the COM in the transmission frame 41 in the CRC'/COM storage space 39. How the K data units and the COM are stored in the drive CM 35 is shown in FIG. 6.

A write request to the disk 150D is then issued (S8). For example, the transmission control unit 23 issues a write request to the disk reader/writer 40. This processing may be performed immediately after S7 or may be performed when the memory management unit 29 concludes that at least a prescribed number of data units have been stored in the data storage space 37.

The read start address in respect of the data storage space 37 is then designated (S9). This may be for example performed by the memory management unit 29 in accordance with the firmware of the hard disk device 150.

The disk reader/writer 40 starts to read K data units sequentially from the read start address designated in respect of the data storage space 37. The disk reader/writer 40 performs processing for alignment of the head and/or processing to rotate the disk (S10) on which the data units are written in accordance with the LA in the data unit at which reading is commenced. Positional location of the head is completed (S13) after the lapse of a given time. A certain time (for example a few seconds) is required for positional location of the head to be completed after commencement of head alignment processing. Accordingly, in order to increase processing speed, the processing of S11 and S12, to be described, is performed in parallel with the head positional location processing.

Figure 7:
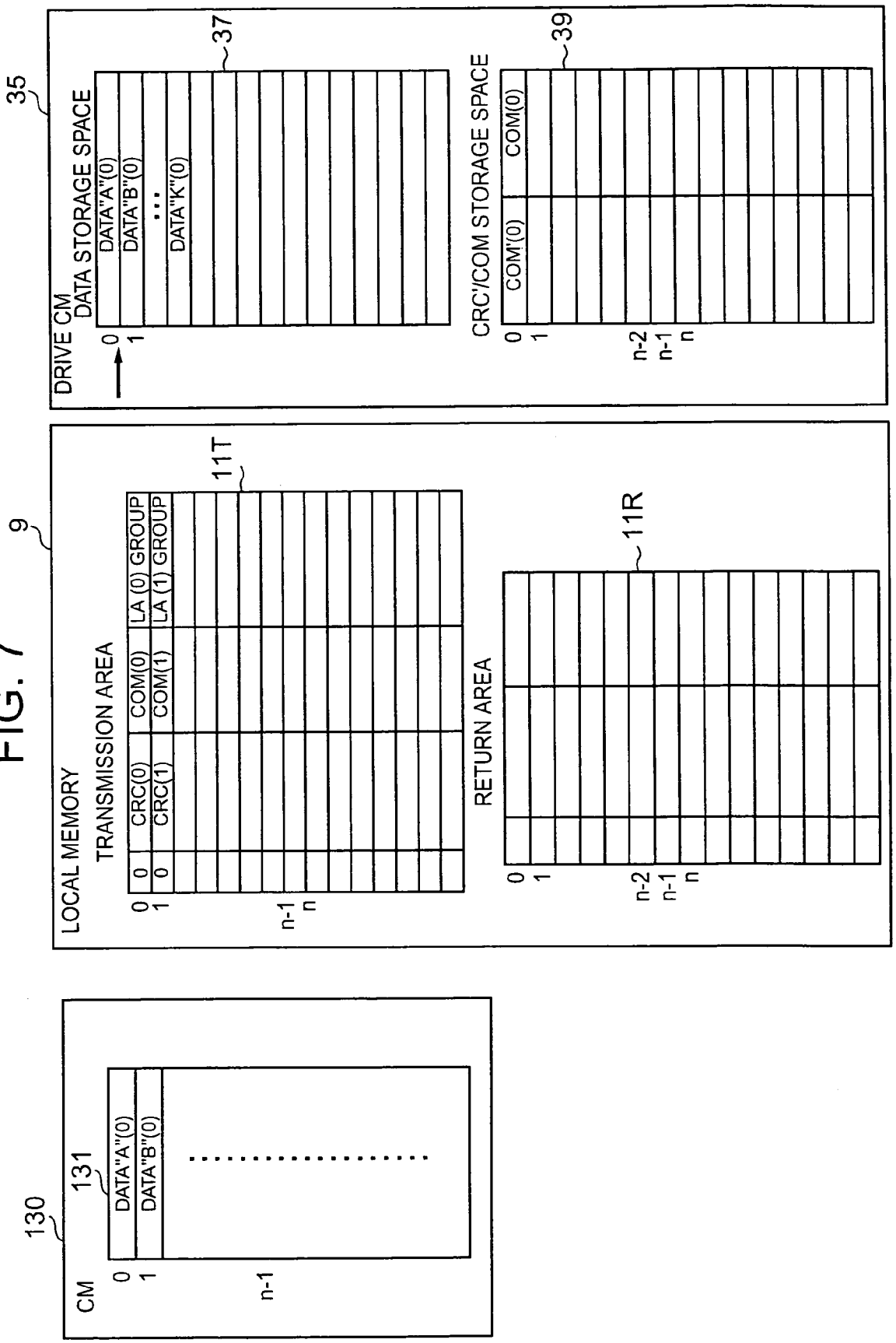
FIG. 7 shows how CRC' generated using K data units read from the data storage space is written to the CRC'/COM storage space.

Specifically, the CRC' calculating unit 21 calculates the CRC' from the K data units that are sequentially read from the read start address designated by the disk reader/writer 40 (S11). This processing can be performed in a shorter time (for example a few milliseconds) than the time required for the head positional location processing. The CRC' calculating unit 21 associates the calculated CRC' with a COM that has not been associated with a CRC' on the CRC'/COM storage space 39 (S12 of FIG. 3). For example, if the calculated CRC' is the CRC'(0) calculated using the K data units in the transmission frame 41 of frame number 0, this CRC'(0) is associated with COM (0). FIG. 7 shows how this is done and how the read start address is designated.

After head positional location has been completed, the data units that have been read are written to the disk (S14).

Figure 8:
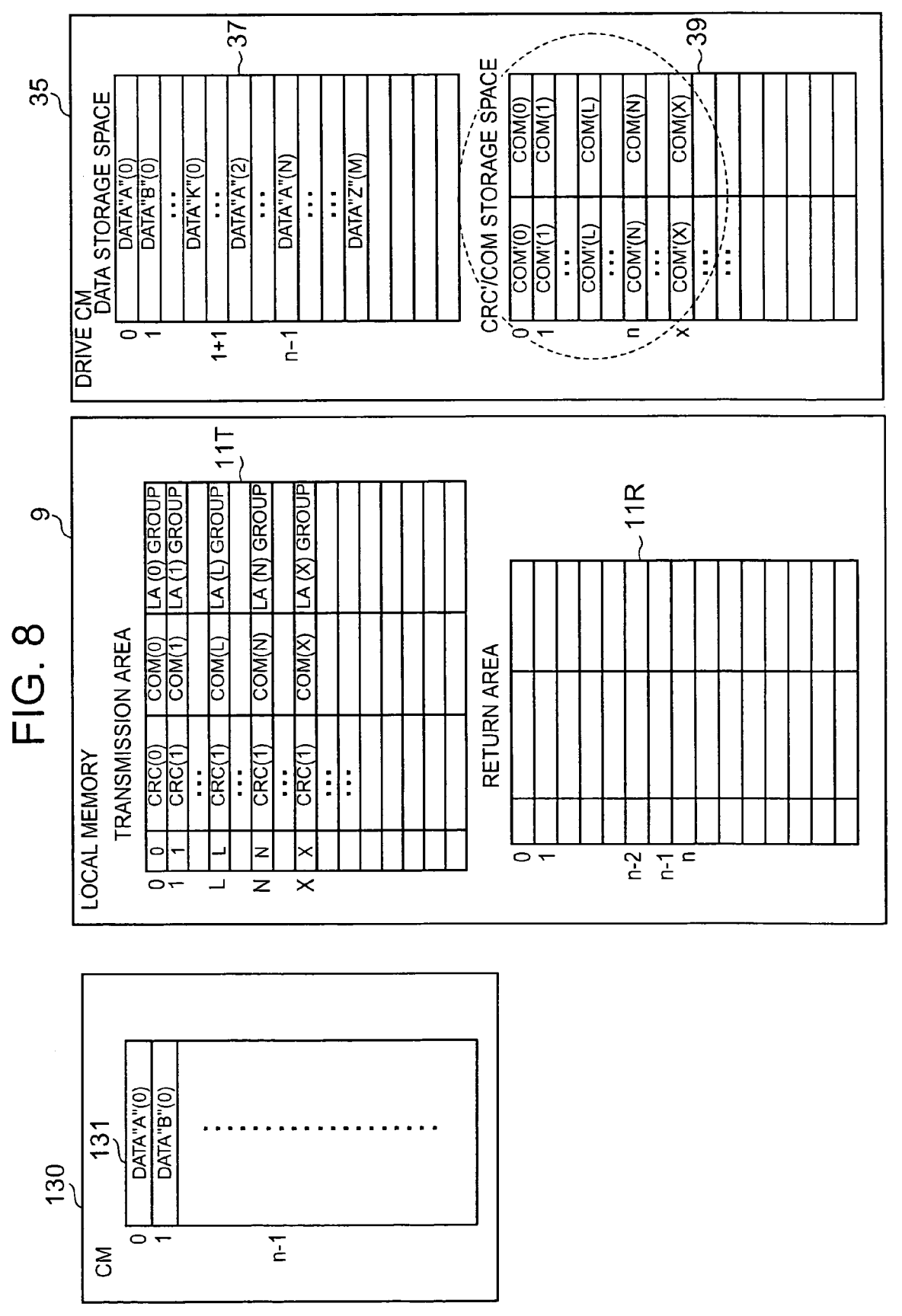

Since the above processing is performed every time a transmission frame 41 is received, the data storage space 37 and the amount of information registered in the CRC'/COM storage space 39 increase. This is shown in FIG. 8.

The memory management unit 29 evaluates whether or not a data unit that is read is the final data unit of the data units present in the data storage space 37 or whether or not more than a prescribed number of CRC' and COM sets are stored in the CRC'/COM storage space 39 (S15).

If, in S15, it is found that the data unit that has been read is the final data unit of the data units present in the data storage space 37, writing to the disk is terminated (S16A).

Also, in S15, if it is found that at least one of the situation that the data unit that has been read is the final data unit and the situation that more than a prescribed number of CRC' and COM sets have been stored, generation processing and transmission processing of a return frame are performed (S16B). Specifically, for example the COM' generating unit 33 generates a COM' including a return frame 43. The transfer control unit 23 reads a prescribed number (for example X in FIG. 8) of CRC' and COM and prepares a frame number and a prescribed number of information sets including CRC' and COM (or a number thereof which is less than the prescribed number may be prepared). The CRC" calculating unit 31 calculates. CRC" in respect of the return frame 43. The transfer control unit 23 generates a return frame 43 including the COM' that has thus been generated, the prescribed number of information sets that have been prepared, and the CRC" that has thus been calculated and transmits this return frame 43 that is thereby generated to the DKA 120. It should be noted that, although, in FIG. 4 to FIG. 11, in contrast to the situation in respect of the transmission area 11T and return area 11R, no frame number is stored in the CRC'/COM storage space 39, the frame order management unit 25 is able to manage which CRC' and COM correspond to which frame number and the correct frame number can therefore be attached to each CRC' and COM set in the return frame 43. This is the same as in the case of the transmission area 11T and return area 11R. Of course, a frame number may be associated with the CRC' and COM set in the CRC'/COM storage space 39 in the same way as in the case of the transmission area 11T and return area 11R. For example, every time a transmission frame 41 is received, the frame sequence management unit 25 may record the frame number in the CRC'/COM storage space 39.

When the transfer control unit 3 of the DKA 120 receives a return frame 43, it stores the information set (frame number, CRC' and COM) in this return frame in the return area 11R as a second information set, as described above (S17).

The comparator 13 compares (S18) each of the CRC' and COM that are stored in the return area 11R and each of the CRC and COM that are stored in the transmission area 11T. Specifically, for example the comparator 13 retrieves first a first information set including a frame number which is the same as the frame number in the second information set in the return area 11R and compares the CRC' and COM in this second information set with the CRC and COM in the first information set which has thus been retrieved and outputs the result of the comparison for example to the MP 120M. If X information sets are stored in the return frame 43, as shown by way of example in FIG. 9, the comparator 13 performs comparison processing as described above in respect of each of the X CRC' and COM and in respect of each of the X CRC and COM.

For example in S9, if a correct address is designated as the read start address in respect of the K data units corresponding to the COM (N) and CRC (N), the K data units corresponding to the COM (N) and CRC (N) are read from the data storage space 37 and a CRC'(N) is generated from these K data units. Consequently, in this case, the CRC'(N) and COM (N) match the CRC (N) and COM (N). However, if a wrong address is designated as the read start address, K spurious data units (for example K data units that are wholly or partially different from the correct K data units), different from the correct K data units corresponding to the COM (N) and CRC (N) are read from the data storage space 37 and the CRC'(N) is generated from these spurious K data units. In this case, therefore, the CRC' (N) and COM (N) do not match the CRC (N) and COM (N). Also, if an error is generated such as occurrence of a mistake in address designation as described above, it is possible for the CRC to be left in the transmission area 11T without comparison processing being performed.

If, as a result of the comparison of S18, a mismatch is obtained, for example the MP 120M specifies the K data units that were employed in the calculation of the CRC (N) using the LA (N) group corresponding to the CRC (N) in respect of this mismatch and requests the specified K data units from the cache region 131 (S19). In this way, the K data units are again sent from the cache region 131 to the DKA 120. It should be noted that, if an unprocessed first information set with a non-continuous frame number is detected in the transmission area 11T (for example a first information set including a frame number 3 when the frame numbers have been 3, 5, 6, . . . ), the processing of S19 could be performed also in respect of the CRC in this first information set.

On the other hand, if, as a result of the comparison of S18, matching was obtained, for example the MP 120M specifies K data units employed in the calculation of the CRC (N) using the LA (N) group corresponding to the CRC (N) with which matching was obtained and writes a request (hereinbelow termed a destaging request) for deletion of the specified K data units from the cache region 131 to the control information storage region 141 of the SM 140 (S20). Write processing is thereby terminated (S21). When such a destaging request is detected by the CHA 110, the CHA 110 deletes the specified K data units from the cache region 131. This is shown in FIG. 10.

In the above series of processes, if at least one of the cache region 131, transmission area 11T, return area 11R, data storage space 37 or CRC'/COM storage space 39 becomes full, as shown by way of example in FIG. 11, the oldest information is overwritten by the latest information (wraparound).

In the embodiments described above, the write data from the host device 180 remains on the CM 130 until detection of whether or not there is a write error to the disk has been performed. Consequently, if a write error to the disk has occurred, writing of correct write data to the disk 150D can be performed without needing to restore the correct write data by data reading from the disk.

Also, with the embodiments described above, even if a write error to the disk occurs, it suffices simply to perform processing to write the write data remaining in the CM 130 again to the disk 150D, so performance deterioration of the storage control device 100 can be suppressed and data writing with high reliability can be provided.

It should be noted that, in the embodiments described above, the plurality of hard disk devices 150 provided in the storage control device 100 could be solely constituted by FC drives (hard disk drives having a fiber channel interface) as shown by way of example in FIG. 13A, could be solely constituted by SATA drives as shown by way of example in FIG. 13B, could be solely constituted by SAS drives as shown by way of example in FIG. 13C or could be constituted by a mixture of FC drives and ATA drives (for example SAS drives or SATA drives) as shown by way of example in FIG. 13D. If both FC drives and ATA drives are present, when for example the DKA 120 is storing data units on a disk, if the storage destination is an ATA drive, performance of processing as shown by way of example in FIG. 3 may be selected; if the storage destination is an FC drive, non-performance of processing as shown by way of example in FIG. 3 may be selected. For this selection processing, for example, after YES at S1 in FIG. 3, the MP 120M may refer to the control information on SM 140 (S499), and may determine whether the storage destination is an FC drive or an ATA drive and may select non-performance of the processing of S2 and the following steps in FIG. 3 if it determines that the drive is an FC drive (S501) and select performance of the processing of S2 and the following steps in FIG. 3 if it determines that the drive is an ATA drive (S502). The control information includes for example the VOL number (or LA) and the correspondence relationship with the type of hard disk drive having this VOL (or LA).

While preferred modes and embodiments of the present invention have been described above, the present invention is not restricted to these modes and embodiments and could of course be modified in various ways without departing from its gist. For example, instead of the CRC, various types of comparison objects could be adopted such as the hash value of a plurality of data units or compressed data. Also, the value of K need not necessarily be a fixed value but could be a variable value.

What is claimed is:

1. A storage control device that receives write data from a host device that transmits the write data constituting data to be written and that writes the write data to storage media, comprising:
   a storage media device comprising storage media that stores data; a cache region that temporarily stores the write data received from said host device;
   a storage media adaptor that acquires the write data stored in said cache region from said cache region and transfers said write data that has thus been acquired to said storage media device; and
   a processor;
   wherein said storage media adaptor comprises:
   a data buffer that accumulates write data acquired from said cache region;
   a first comparison object generating unit that generates a first comparison object in respect of K items of write data when at least K items of write data, where K is an integer of 1 or more, of write data have been accumulated in said data buffer;
   a first comparison object storage region that stores said first comparison object that was thus generated; and
   an adaptor transmitter, which is a transmitter that transmits a data frame including said K items of write data to said storage media device;
   wherein said storage media device comprises:
   a storage media receiver that is a receiver that receives said data frame from said storage media adaptor;
   a data storage region that respectively comprises a plurality of sub-regions that store at least one item of write data and addresses for specifying said sub-regions and accumulates in at least one sub-region of said plurality of sub-regions K items of write data contained in said received data frame;
   an address designating unit that designates the start address for reading from the plurality of addresses of said data storage region;
   a storage media writing unit that reads write data from the sub-region indicated by said designated address and writes said write data that has thus been read in said storage media;
   a second comparison object generating unit that, when K items of write data are read from said data storage region, generates a second comparison object in respect of said K items of write data that have thus been read;
   a second comparison object storage region that stores said second generated comparison object;
   and a storage media transmitter that is a transmitter that transmits the second comparison object stored in said second comparison object storage region to said storage media adaptor;
   wherein said storage media adaptor further comprises
   an adaptor receiver that is a receiver that receives said second comparison object; and
   a comparator that compares said received second comparison object with said first comparison object stored in said first comparison object storage region;
   wherein, if, as a result of the comparison performed by said comparator, it is found that said received second comparison object does not match any of the plurality of first comparison objects stored in said first comparison object storage region, said processor causes said storage media adaptor to acquire from said cache region the K items of write data that were previously transmitted, and said adaptor transmitter then retransmits to said storage media device said data frame including said acquired K items of write data.

2. The storage control device according to claim 1 wherein, if, as a result of the comparison by said comparator, it is found that said received second comparison object matches any one of said plurality of first comparison objects stored in said first comparison object storage region, said processor then erases the K items of write data corresponding to this first comparison object from said cache region.

3. The storage control device according to claim 2 wherein said storage control device further comprises a channel adaptor comprising a first processor and that receives said write data from the host device, and writes said write data that has thus been received in said cache region, and a shared storage region that is a storage region accessible by both said channel adaptor and said storage media adaptor;
   said storage media adaptor comprises a second processor; and
   if, as a result of the comparison performed by said comparator, it is found that said received second comparison object matches any one of the plurality of first comparison objects stored in said first comparison object storage region, the second processor writes information indicating the fact that a match has been achieved in said shared storage region; and if the first processor detects that such information indicating that a match has been achieved is stored in said shared storage region, said first processor deletes the K items of write data corresponding to this first comparison object from said cache region.

4. The storage control device according to claim 1 wherein said first comparison object and said second comparison object are data groups including code for error detection in respect of said K items of write data.

5. The storage control device according to claim 1 wherein said first comparison object storage region stores first item of identification information for identifying at least one first comparison object from a plurality of first comparison objects;

said storage media transmitter transmits at least one second comparison object and a second item of identification information corresponding to said at least one second comparison object to said storage media adaptor; and said comparator compares said at least one second comparison object with said at least one first comparison object identified from said first item of identification information matching said second item of identification information.

6. The storage control device according to claim 5 wherein said first item of identification information includes a frame number indicating the transmission sequence number of the data frame including the K items of write data corresponding to said first comparison object; and said second item of identification information includes the frame number associated with said second comparison object.

7. The storage control device according to claim 1 wherein said storage media transmitter transmits to said storage media adaptor an information group including a plurality of second comparison objects; and the data size of said information group is no more than the data size of said data frame transmitted by said adaptor transmitter.

8. The storage control device according to claim 7 wherein said first comparison object storage region stores a first item of identification information for identifying a first comparison object from said plurality of first comparison objects; and said storage media transmitter transmits to said storage media adaptor said information group including a plurality of sets of the second comparison object and second item of identification information corresponding to said second comparison object; and said comparator compares the second comparison objects contained in said information group with the first comparison object identified from the first item of identification information matching the second item of identification information corresponding to this second comparison object.

9. The storage control device according to claim 1 wherein said storage media device is a hard disk device, said hard disk device is the hard disk drive itself or a device comprising a hard disk drive, and said hard disk drive is an ATA drive.

10. The storage control device according to claim 1 wherein said storage media device is a hard disk device;

said hard disk device is a hard disk drive itself or a device comprising a hard disk drive;

said storage control device comprises a high reliability hard disk device and a hard disk device of lower reliability than said high reliability hard disk device;

said storage media adaptor is connected with both said high reliability hard disk device and said hard disk device of lower reliability;

said high reliability hard disk device is a high reliability drive itself or a device comprising the high reliability drive;

said lower reliability hard disk device is itself a drive of lower reliability than said high reliability drive or is a device comprising such a drive; and said comparator performs said comparison in the case where the transmission destination of the write data is the lower reliability hard disk device.

11. A storage control method that is executed by a storage control device that receives write data from a host device that transmits write data constituting data to be written and that writes this write data to storage media; wherein said storage control device comprises a storage media storage device provided with storage media;

said storage media storage device comprises a data storage region that respectively comprises a plurality of sub-regions that store at least one item of write data and addresses for specifying said sub-regions; and said storage control method comprising the steps of:

receiving write data from a host device;

writing said received write data in a cache region where write data is temporarily stored;

generating a first comparison object in respect of K items of write data, where K is an integer of 1 or more, that are written to said cache region;

writing said generated first comparison object to the comparison object storage region;

generating a data frame containing said K items of write data and transmitting said generated data frame to a storage media device having storage media;

writing the K items of write data included in the data frame received by said storage media device in at least one sub-region of the plurality of sub-regions in said data storage region;

designating the start address for reading from the plurality of addresses of said data storage region;

reading write data from said sub-region indicated by the designated address and writing said write data that has thus been read to said storage media;

generating a second comparison object in respect of said K items of write data that have thus been read, in the case where K items of write data are read from said data storage region;

writing said generated second comparison object to a second comparison object storage region;

transmitting a second comparison object stored in said second comparison object storage region;

comparing said second transmitted comparison object with the first comparison objects stored in said first comparison object storage region; and acquiring the K items of write data that were previously transmitted from said cache region, and retransmitting said data frame including said acquired K items of write data to said storage media device, if the comparison result is that the second comparison object does not match any of the plurality of first comparison objects stored in said first comparison object storage region.

12. A storage control device that receives write data from a host device that transmits the write data constituting data to be written and that writes said write data to storage media, comprising:

storage media that stores data;

a cache region that temporarily stores the write data received from the host device;

a cache acquisition unit that acquires K items of write data, where K is an integer of 1 or more, written to said cache region;

a first comparison object generating unit that generates a first comparison object in respect of said K items of write data;

a first comparison object storage region that stores said first comparison object that was thus generated;

a data storage region that respectively comprises a plurality of sub-regions that store at least one item of write data and addresses for specifying said sub-regions, and stores said K items of write data in at least one sub-region of said plurality of sub-regions;

an address designating unit that designates the start address for reading from the plurality of addresses of said data storage region;

a storage media writing unit that reads write data from the sub-region indicated by said designated address and writes said write data that has thus been read in said storage media;

a second comparison object generating unit that, when K items of write data are read from said data storage region, generates a second comparison object in respect of said K items of write data that have thus been read; and a comparison unit that compares said generated second comparison object with the first comparison object stored in said first comparison object storage region; wherein if, as a result of the comparison by said comparison unit, it is found that said second comparison object matches none of the plurality of first comparison objects stored in said first comparison object storage region, said cache acquisition unit acquires K items of write data from said cache region, and said data storage region stores said acquired K items of write data.

13. The storage control device according to claim 12 further comprising a data deletion unit that deletes K items of write data corresponding to the first comparison object from said cache region, if, as a result of the comparison performed by said comparison unit, it is found that said received second comparison object matches any one of the plurality of first comparison objects stored in said first comparison object storage region.

14. The storage control device according to claim 12 wherein said first comparison object and said second comparison object are data groups including code for error detection in respect of the K items of write data.

15. The storage control device according to claim 12 wherein said first comparison object storage region stores first item of identification information for identifying a first comparison object from a plurality of first comparison objects;

said storage control device further comprises a specifying unit for specifying, from said first comparison object storage region, a first item of identification information matching a second item of identification information corresponding to the second comparison object; and said comparison unit compares the first comparison object identified from said specified first item of identification information and the second comparison object corresponding to said second item of identification information.

16. The storage control device according to claim 15 further comprising:

a storage media device comprising said storage media; and a data frame transmission unit that generates a data frame including K items of write data in said cache region and transmits said generated data frame to said storage media device; wherein said first item of identification information includes a frame number indicating the transmission sequential number of the data frame including the K items of write data corresponding to said first comparison object; and said second item of identification information includes a frame number associated with said second comparison object.

* * * * *